United States Patent
Kaloxylos et al.

(10) Patent No.: US 10,200,966 B2
(45) Date of Patent: Feb. 5, 2019

(54) MOBILE WIRELESS COMMUNICATION DEVICE AND METHOD

(71) Applicant: Huawei Technologies Duesseldorf GmbH, Duesseldorf (DE)

(72) Inventors: Alexandros Kaloxylos, Munich (DE); Oemer Bulakci, Munich (DE); Konstantinos Chatzikokolakis, Munich (DE); Panagiotis Spapis, Munich (DE); Athanasia Alonistioti, Munich (DE)

(73) Assignee: Huawei Technologies Duesseldorf GmbH, Duesseldorf (DE)

( * ) Notice: Subject to any disclaimer, the term of this patent is extended or adjusted under 35 U.S.C. 154(b) by 0 days.

(21) Appl. No.: 15/816,625

(22) Filed: Nov. 17, 2017

(65) Prior Publication Data
US 2018/0077676 A1    Mar. 15, 2018

Related U.S. Application Data

(63) Continuation of application No. PCT/EP2015/060875, filed on May 18, 2015.

(51) Int. Cl.
*H04W 4/02* (2018.01)
*H04W 64/00* (2009.01)
(Continued)

(52) U.S. Cl.
CPC ........... *H04W 64/00* (2013.01); *H04W 68/02* (2013.01); *H04W 74/0833* (2013.01);
(Continued)

(58) Field of Classification Search
CPC ....... H04W 60/04; H04W 8/08; H04W 60/00; H04W 8/26; H04W 8/02; H04W 4/08;
(Continued)

(56) References Cited

U.S. PATENT DOCUMENTS 8,279,810 B1   10/2012  Li et al.
8,369,876 B2   2/2013   Bachmann et al.
(Continued)

FOREIGN PATENT DOCUMENTS

EP    1648188 A1    4/2006

OTHER PUBLICATIONS

Chen et al., "A Four-layers Hierarchical Clustering Topology Architecture with Sleep Mode in a Wireless Sensor Network," 2013 Seventh International Conference on Complex, Intelligent, and Software Intensive Systems, pp. 335-339, Institute of Electrical and Electronics Engineers, New York, New York (Jul. 2013).

(Continued)

*Primary Examiner* — Nimesh Patel
(74) *Attorney, Agent, or Firm* — Leydig, Voit & Mayer, Ltd.

(57) ABSTRACT

The disclosure relates to a mobile wireless communication device (101a-c) configured to communicate with a location management server (105) over a wireless communication network. The mobile wireless communication device (101a-c) is configured to be part of a cluster of mobile wireless communication devices managed on the basis of a clustering protocol, wherein the clustering protocol is configured to select one of the mobile wireless communication devices (101a-c) of the cluster of mobile wireless communication devices to be a cluster head for representing the cluster of mobile wireless communication devices. The mobile wireless communication devices (101a-c) of the cluster of mobile wireless communication devices are either in a network-connected mode or a network-idle mode relative to the wireless communication network.

15 Claims, 7 Drawing Sheets

(51) Int. Cl.
*H04W 84/00* (2009.01)
*H04W 84/20* (2009.01)
*H04W 76/27* (2018.01)
*H04W 68/02* (2009.01)
*H04W 74/08* (2009.01)

(52) U.S. Cl.
CPC ......... *H04W 76/27* (2018.02); *H04W 84/005* (2013.01); *H04W 84/20* (2013.01)

(58) Field of Classification Search
CPC ....... H04W 4/70; H04W 24/02; H04W 48/16; H04W 88/06; H04W 72/005; H04W 84/18; H04W 28/06; H04W 4/02; H04W 63/1416; H04W 63/08; H04W 4/023; H04W 76/15; H04W 12/06; H04W 4/026; H04W 4/21; H04W 4/06; H04W 4/50; H04W 4/029; H04W 4/18; H04W 4/80; H04W 64/00; H04W 88/02; H04W 8/205
See application file for complete search history.

(56) References Cited

U.S. PATENT DOCUMENTS

| | | | |
|---|---|---|---|
| 2002/0142803 A1* | 10/2002 | Yamamoto | H04M 1/6091 455/557 |
| 2010/0056175 A1* | 3/2010 | Bachmann | H04W 8/08 455/456.1 |
| 2011/0149816 A1 | 6/2011 | Saito et al. | |
| 2014/0092833 A1* | 4/2014 | Vannithamby | H04W 4/70 370/329 |
| 2015/0208457 A1* | 7/2015 | Thanayankizil | H04W 76/15 370/329 |
| 2015/0296404 A1* | 10/2015 | Sharma | H04W 28/0215 370/230 |
| 2015/0358471 A1* | 12/2015 | Roth | B60K 37/00 455/417 |
| 2017/0177833 A1* | 6/2017 | Lewallen | G09B 19/0038 |

OTHER PUBLICATIONS

Fu et al., "Group Mobility Management for Large-Scale Machine-to-Machine Mobile Networking," IEEE Transactions on Vehicular Technology, vol. 63, No. 3, pp. 1296-1305, Institute of Electrical and Electronics Engineers, New York, New York (Mar. 2014).

Sailhan et al., "Wireless Mesh Network Monitoring: Design, Implementation and Experiments," 2007 Globecom Workshops, pp. 1-6, Institute of Electrical and Electronics Engineers, New York, New York (Nov. 2007).

"3rd Generation Partnership Project; Technical Specification Group Services and System Aspects; General Packet Radio Service (GPRS) enhancements for Evolved Universal Terrestrial Radio Access Network (E-UTRAN) acess (Release 13)," 3GPP TS 23A01, V13.2.0, pp. 1-313, 3rd Generation Partnership Project, Valbonne, France (Mar. 2015).

"3rd Generation Partnership Project; Technical Specification Group Radio Access Network; Evolved Universal Terrestrial Radio Access (E-UTRA); User Equipment (UE) procedures in idle mode (Release 12)," 3GPP TS 36.304, V12.4.0, pp. 1-38, 3rd Generation Partnership Project, Valbonne, France (Mar. 2015).

* cited by examiner

MOBILE WIRELESS COMMUNICATION DEVICE AND METHOD

CROSS-REFERENCE TO RELATED APPLICATIONS

This application is a continuation of International Application No. PCT/EP2015/060875, filed on May 18, 2015, the disclosure of which is hereby incorporated by reference in its entirety.

TECHNICAL FIELD

The present disclosure relates to a mobile wireless communication device and method. In particular, the present disclosure relates to a mobile wireless communication device and method for communicating with a location management server over a wireless communication network, such as a vehicular ad-hoc network or cellular communication networks for machine-type human-centric wireless communication devices.

BACKGROUND

During the last couple of years a huge increase in the number of smart phones, tablet computers and other cellular end user devices has been witnessed. Forecasts predict that by the year 2019 mobile network operators worldwide will have to support more than 8 billion of such devices. Major trends for wireless cellular-based communication systems, such as an increasing number of wirelessly-connected devices as well as their required control information exchange, indicate that the current network signaling solutions will be stretched to their performance limits. Furthermore, the deployment of small cells will also create additional overhead to the network components.

To efficiently support such communication needs, it is required to design new solutions that will offer a considerable overall reduction of signaling messages and avoid bottlenecks of control channels in future cellular networks. One such area that calls for improvement, so as to avoid overloading the network components and the air interface channels, is location management. Location management in cellular systems comprises mainly two processes related to location update and location search/paging. The former is an occasional process during which a mobile device, also referred to as user equipment (UE) herein, sends information related to its current location to the network. For example in 3GPP this process is described in TS23.401. This subsequently leads to a location profile update in a location management server in the network. The profile may include a set of Location Areas (also known as Tracking Areas, TAs) that the UE may reside in without needing to send a new update. This set is commonly referred to as Tracking Area List (TAL). Herein the terms Location Area and Tracking Area are used interchangeably. 3GPP communication systems apply a central policy that assigns a new TAL whose central TA includes the cell where the UE currently resides. This suggests that by making the center of this set of tracking areas close to the UE's current location, the necessity of a UE rapidly making another tracking area update can be reduced. The procedure is initiated by a UE regardless if it is in idle or connected state relative to the cellular network. On the other hand, paging is a process initiated from the network in order to discover the UE when it is in idle state. The paging message according to the 3GPP standard TS36.304 is transmitted across the cells included in all the Tracking Areas that the UE is registered in (which constitute its Tracking Area List). UEs should periodically wake up and listen to the messages transmitted over the Paging Channel (PCH). These messages include the identities of the UEs that are being paged. If the message refers to the UE that listens to the PCH, then the upper layers in the UE trigger a connection establishment, which may be in response to paging. The UE checks if access is barred and if not, the lower layers in the UE perform a contention-based random access procedure.

A signaling trade-off between Tracking Area Update and Paging processes exists. In particular, large Tracking Areas (TA) and/or long Tracking Area Lists (TALs) reduce the number of updates but increase drastically the number of paged cells. On the contrary, small TAs and/or short TALs reduce the number of paged cells but lead to increased number of location updates triggered from the UEs. Hence, it is important to use location management schemes that keep a concise set of location information (i.e., Tracking Areas Lists) for all UEs, while optimizing the signaling overhead for finding the UEs.

Grouping of UEs to clusters is a promising solution in order to support the vast number of UEs in cellular networks. Grouping may be performed based on common behavior among mobile devices e.g., observed moving patterns of UEs or any other characteristic related to the way UEs use services. For example, moving patterns of UEs can be utilized, and the UEs with correlated mobility can be clustered together. As far as location management is concerned, a single member of the group can be assigned with the task to report the location of the whole cluster. Having a representative to report the location of the whole group (hereinafter called cluster rapporteur) can reduce the overall number of location updates.

However, this type of solutions faces some serious shortcomings. An analysis of past historical data, related to moving patterns has to be performed to form a cluster. Although applicable to UEs that present repetitive behavior, they are not suitable for clustering UEs that do not share this attribute (e.g., moving cars). For such cases, the paging accuracy can become even worse than the standard 3GPP process defined in TS36.304, if the page miss ratio increases. This can particularly happen, for example, when the moving pattern of a cluster member becomes different from the moving pattern of the cluster representative, also called cluster header. In this case, these mechanisms have a slow response time, during which the location information for that member that is stored in the network may be incorrect. As a consequence, the network may not be able locate the UE correctly so as to route its incoming calls or data to it, resulting in page miss. Thus, it is difficult to avoid page misses when performing location management for one or multiple users. Moreover, such solutions require that the UEs perform their periodic location update independently if they cross the boundaries of a location area or not.

In a cluster-based method described in U.S. Pat. No. 8,369,876 the decision for altering the Location Management is taken by the network. This includes registering devices to clusters, which is done by the network based on past behavior and selecting a cluster representative. This kind of clustering is restrictive because the past behavior does not necessarily mean that it will be repeated in the future (e.g., it is only valid for cyclic sequences), and in addition, it adds extra computational effort to the network entities so as to register devices to clusters.

A similar approach, which faces the above described drawbacks as well, is disclosed in the article "Group Mobility Management for Large-Scale Machine-to-Machine Mobile Networking", Huai-Lei Fu, Phone Lin, Hao Yue, Guan-Ming Huang, Chia-Peng Lee, Vehicular Technology, IEEE Transactions, vol. 63, no. 3, pp. 1296, 1305, March 2014.

Thus, there is a need for improved mobile wireless communication devices and methods for communicating with a location management server over a wireless communication network, in particular mobile wireless communication devices and methods for communicating with a location management server over a wireless communication network reducing the signaling overhead in the wireless communication network.

SUMMARY

It is an objective of the disclosure to provide improved mobile wireless communication devices and methods for communicating with a location management server over a wireless communication network, in particular mobile wireless communication devices and methods for communicating with a location management server over a wireless communication network reducing the signaling overhead in the wireless communication network.

This objective is achieved by the subject matter of the independent claims. Further implementation forms are provided in the dependent claims, the description and the figures.

According to a first aspect the disclosure relates to a mobile wireless communication device configured to communicate with a location management server over a wireless communication network, in particular a cellular wireless communication network. The mobile wireless communication device is configured to be part of a cluster of mobile wireless communication devices managed on the basis of a clustering protocol, wherein the clustering protocol is configured to select one of the mobile wireless communication devices of the cluster of mobile wireless communication devices to be a cluster head for representing the cluster of mobile wireless communication devices. The mobile wireless communication devices of the cluster of mobile wireless communication devices are either in a network-connected mode or a network-idle mode relative to the wireless communication network. The mobile wireless communication device is configured to select, in case the mobile wireless communication device is the cluster head, one of the mobile wireless communication devices of the cluster of mobile wireless communication devices, including the mobile wireless communication device itself, being in the network-connected mode to be a cluster rapporteur for communicating with the location management server. In case the mobile wireless communication device is not the cluster head and is in the network-connected mode, the mobile wireless communication device is configured to be selected by the cluster head as the cluster rapporteur for communicating with the location management server.

In a first possible implementation form of the first aspect of the disclosure, in case the mobile wireless communication device is the cluster rapporteur, the mobile wireless communication device is configured to send cluster location management information to the location management server, wherein the cluster location management information comprises information about the location of the cluster head and/or information about the respective locations of the mobile wireless communication devices of the cluster of mobile wireless communication devices, and, in case the mobile wireless communication device is not the cluster rapporteur, the mobile wireless communication device is configured to refrain from sending device location management information to the location management server, wherein the device location management information comprises information about the location of the wireless communication device.

In a second possible implementation form of the first implementation form of the first aspect of the disclosure, the mobile wireless communication device is configured, in case the mobile wireless communication device is the cluster head, to select itself to be the cluster rapporteur for communicating with the location management server, in case the mobile wireless communication device is in the network-connected or the network-idle mode and the other mobile wireless communication devices of the cluster of mobile wireless communication devices are in the network-idle mode.

In a third possible implementation form of the first or second implementation form of the first aspect of the disclosure, the wireless communication network comprises a LTE network, a LTE-A network or a future evolution thereof and the mobile wireless communication device is configured, in case the mobile wireless communication device is the cluster head and all mobile wireless communication devices are in the network-idle mode, to use a non-contentious RACH procedure for sending the cluster location management information to the location management server.

In a fourth possible implementation form of the third implementation form of the first aspect of the disclosure, the mobile wireless communication device is configured, in case the mobile wireless communication device is the cluster head and all mobile wireless communication devices are in the network-idle mode, to perform the non-contentious RACH procedure on the basis of at least one dedicated RACH preamble from at least one base station of the wireless communication network.

In a fifth possible implementation form of the third or fourth implementation form of the first aspect of the disclosure, the mobile wireless communication device is configured to request the at least one dedicated RACH preamble from a source base station and to receive the at least one RACH preamble from the source base station, wherein the source base station has received the at least one dedicated RACH preamble from at least one neighboring base station.

In a sixth possible implementation form of any one of the first to fifth implementation form of the first aspect of the disclosure, the wireless communication network comprises a LTE network, a LTE-A network or a future evolution thereof and, in case the mobile wireless communication device is the cluster rapporteur, the mobile wireless communication device is configured to use an enhanced RRC connection request to send the cluster location management information to the location management server, wherein the enhanced RRC connection request includes a marker for indicating that the request is to be rejected and that the location of the mobile wireless communication device is to be forwarded to the location management server.

In a seventh possible implementation form of any one of the first to sixth implementation form of the first aspect of the disclosure, in case the mobile wireless communication device is the cluster rapporteur, the mobile wireless communication device is configured to determine the frequency or the content of the cluster location management information or the events that trigger the sending of the cluster location management information to the location management server.

In an eighth possible implementation form of any one of the first to seventh implementation form of the first aspect of the disclosure, the cluster location management information to be sent by the mobile wireless communication device to the location management server, in case the mobile wireless communication device is the cluster rapporteur, comprises an identifier of the cluster of mobile wireless communication devices, location information about the cluster head, information about the velocity of the cluster head, a list pairing an identifier of a wireless mobile communication device of the cluster of mobile wireless communication devices, such as an IMSI, with an identifier of a cell of the wireless communication network, and/or the coverage area of the cluster of mobile wireless communication devices.

In a ninth possible implementation form of any one of the first to eighth implementation form of the first aspect of the disclosure, the wireless communication network comprises a LTE network, a LTE-A network or a future evolution thereof and, in case the mobile wireless communication device is not the cluster rapporteur, the mobile wireless communication device is configured to refrain from sending the device location management information to the location management server by suppressing sending of tracking area update requests to the location management server or by suppressing location update timers.

In a tenth possible implementation form of any one of the first to ninth implementation form of the first aspect of the disclosure, in case the mobile wireless communication device is the cluster rapporteur, the mobile wireless communication device is configured to send the cluster location management information to the location management server, each time another mobile wireless communication device joins the cluster of mobile wireless communication devices, another mobile wireless communication device leaves the cluster of mobile wireless communication devices and/or the cluster of mobile wireless communication devices is changed in a different way.

In an eleventh possible implementation form of the first aspect of the disclosure as such or any one of the first to tenth implementation form thereof, the mobile wireless communication device is configured to communicate with the other mobile wireless communication devices of the cluster of mobile wireless communication devices over an intra-cluster communication channel.

According to a second aspect the disclosure relates to a location management server configured to communicate over a wireless communication network with a cluster of wireless communication devices including a wireless communication device according to the first aspect of the disclosure, wherein the location management server is configured to receive cluster location management information from the mobile wireless communication device, in case the mobile wireless communication device is the cluster rapporteur, and to adapt a location area list building procedure and/or a paging procedure implemented in the location management server on the basis of the global location management data message.

According to a third aspect the disclosure relates to a wireless communication system comprising a plurality of mobile wireless communication devices according to the first aspect of the disclosure configured to communicate with a location management server according to the second aspect of the disclosure over a wireless communication network.

According to a fourth aspect the disclosure relates to a method of operating a mobile wireless communication device configured to communicate with a location management server over a wireless communication network. The mobile wireless communication device is configured to be part of a cluster of mobile wireless communication devices managed on the basis of a clustering protocol. The clustering protocol is configured to select one of the mobile wireless communication devices of the cluster of mobile wireless communication devices to be a cluster head for representing the cluster of mobile wireless communication devices. The mobile wireless communication devices of the cluster of mobile wireless communication devices are either in a network-connected mode or a network-idle mode relative to the wireless communication network. The method comprises the following step in the mobile wireless communication device: selecting one of the mobile wireless communication devices of the cluster of mobile wireless communication devices, including the mobile wireless communication device itself, being in the network-connected mode to be a cluster rapporteur for communicating with the location management server; or being selected, in case the mobile wireless communication device is not the cluster head and is in network-connected mode, by the cluster head as the cluster rapporteur for communicating with the location management server.

The method according to the fourth aspect of the disclosure can be performed by the mobile wireless communication device according to the first aspect of the disclosure. Further features of the method according to the fourth aspect of the disclosure result directly from the functionality of the mobile wireless communication device according to the first aspect of the disclosure and its different implementation forms.

According to a fifth aspect the disclosure relates to a computer program comprising program code for performing the method according to the fourth aspect of the disclosure when executed on a computer.

The disclosure can be implemented in hardware and/or software.

BRIEF DESCRIPTION OF THE DRAWINGS

Further embodiments of the disclosure will be described with respect to the following figures, in which.

DETAILED DESCRIPTION OF EMBODIMENTS

In the following detailed description, reference is made to the accompanying drawings, which form a part of the disclosure, and in which are shown, by way of illustration, specific aspects in which the disclosure may be practiced. It is understood that other aspects may be utilized and structural or logical changes may be made without departing from the scope of the present disclosure. The following detailed description, therefore, is not to be taken in a limiting sense, and the scope of the present disclosure is defined by the appended claims.

It is understood that a disclosure in connection with a described method may also hold true for a corresponding device or system configured to perform the method and vice versa. For example, if a specific method step is described, a corresponding device or apparatus may include a unit to perform the described method step, even if such unit is not explicitly described or illustrated in the figures. Further, it is understood that the features of the various exemplary aspects described herein may be combined with each other, unless specifically noted otherwise.

Figure 1:
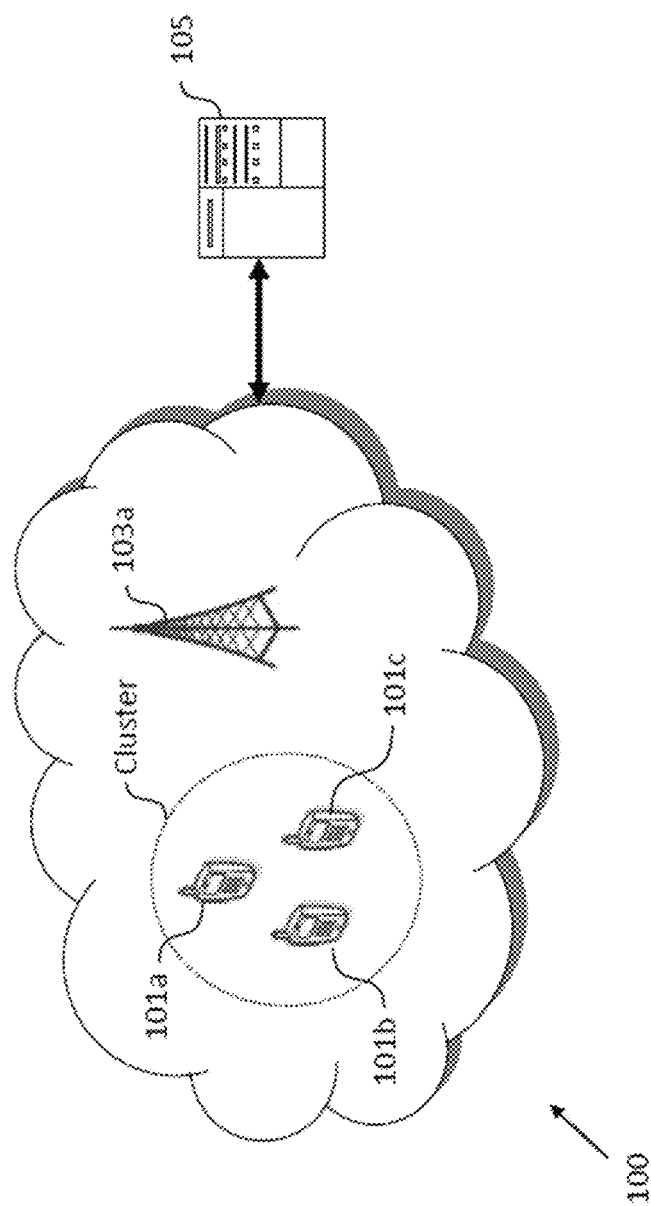
FIG. 1 shows a schematic diagram of a mobile wireless communication device according to an embodiment as part of a mobile wireless communication system.

FIG. 1 shows a schematic diagram of a mobile wireless communication system 100 according to an embodiment. The mobile wireless communication system 100 comprises a plurality of mobile wireless communication devices 101a-c. Each of these mobile wireless communication devices, for instance, the mobile wireless communication device 101a is configured to communicate with a location management server 105 over a wireless communication network. In an embodiment, the wireless communication network comprises a base station 103a in communication with the location management server 105. The mobile wireless communication device 101a could be implemented, for instance, as a mobile phone, a smart phone, a tablet computer, a communication module of a vehicle any other type of mobile user equipment (also referred to as UE) configured to communicate over the wireless communication network. As is well known to the person skilled in the art, such mobile user equipment can include hardware components, such as an antenna, a transceiver, an LTE module, a processor and the like to communicate over the wireless communication network. The wireless communication network could be a cellular wireless communication network, for instance, a LTE network, a LTE-A network or a future evolution (5G) thereof.

As indicated by the dashed circle in FIG. 1, the mobile wireless communication device 101a is configured to be part of a cluster of mobile wireless communication devices, including the by way of example the mobile wireless communication devices 101b and 101c shown in FIG. 1. The cluster of mobile wireless communication devices including the wireless communication devices 101a-c is managed on the basis of a clustering protocol or clustering algorithm. The clustering protocol is configured to select one of the mobile wireless communication devices of the cluster to be a cluster head for representing the cluster of mobile wireless communication devices.

Figure 2:
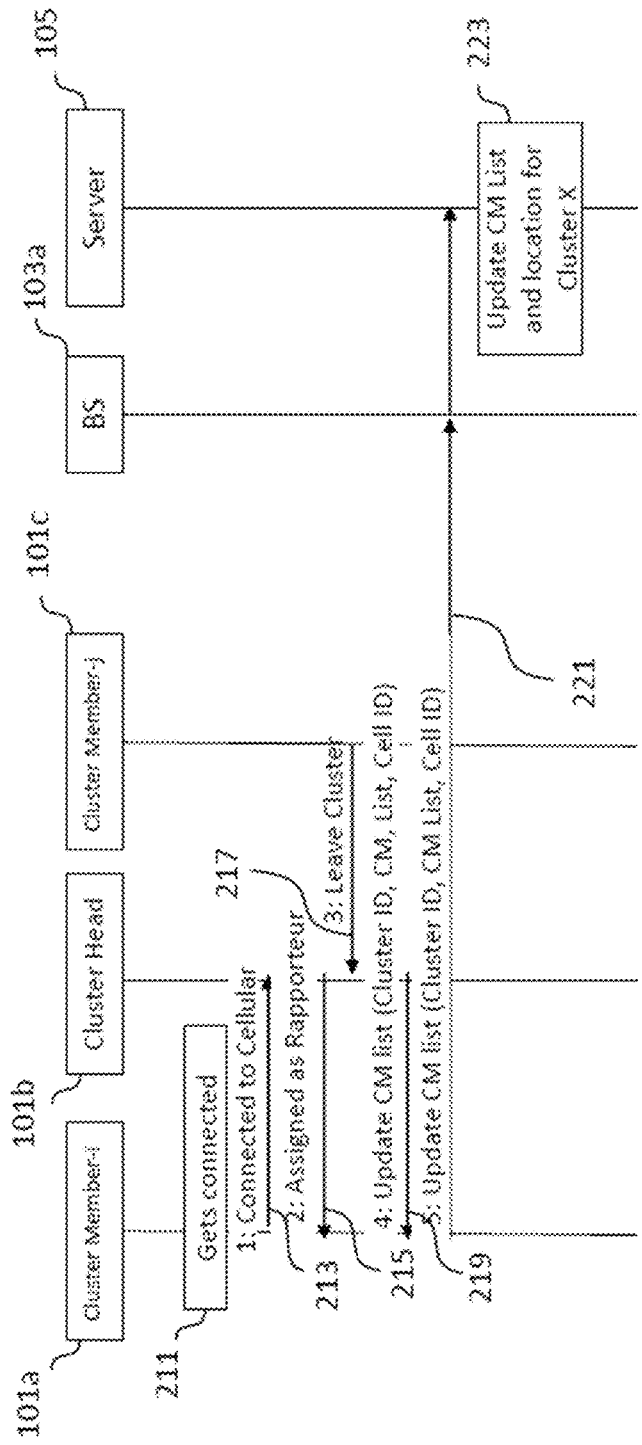
FIG. 2 shows a schematic diagram of a mobile wireless communication device and a method for communicating with a location management server over a wireless communication network according to an embodiment.

Under further reference to the exemplary embodiment shown in FIG. 2, where the mobile wireless communication device 101a is referred to as "Cluster Member-i", the mobile wireless communication device 101b is referred to as "Cluster Head" and the mobile wireless communication device 101c is referred to as "Cluster Member-j", the mobile wireless communication device 101b has been selected on the basis of the clustering protocol to be the cluster head, i.e. the representative of the cluster including the mobile wireless communication devices 101a-c. As various suitable clustering protocols, in particular for selecting a cluster head, are known to the person skilled in the art, these are not described in greater detail herein. In this respect reference is made to the article "A survey on clustering algorithms for vehicular ad-hoc networks" by S. Vodopivec, J. Bester, A. Kos, 35th International Conference on Telecommunications and Signal Processing (TSP), 2012.

The mobile wireless communication devices of the cluster of mobile wireless communication devices, such as the exemplary mobile wireless communication devices 101a-c shown in FIGS. 1 and 2 can be either in a network-connected mode or a network-idle mode relative to the wireless communication network. In an embodiment, where the wireless communication network is a LTE network, a LTE-A network or a future evolution thereof, the network-connected mode is the LTE RRC connected mode and the network-idle mode is the LTE RRC idle mode.

In the exemplary embodiment shown in FIG. 2 the mobile wireless communication device 101b is the cluster head. The mobile wireless communication device 101b is configured to select one of the mobile wireless communication devices of the cluster of mobile wireless communication devices, including the mobile wireless communication device 101b itself, being in the network-connected mode to be a cluster rapporteur of the cluster for communicating with the location management server 105. This is further illustrated in FIG. 2.

In step 211 of FIG. 2 one of the mobile wireless communication devices of the cluster of mobile wireless communication devices, namely the mobile wireless communication device 101a gets connected to the wireless communication network, i.e. changes its state from network-idle mode to network-connected mode. In step 213 of FIG. 2 the mobile wireless communication device 101a informs the cluster head, i.e. the mobile wireless communication device 101b, about its change of state. In an embodiment, the mobile wireless communication device 101a can communicate with the mobile wireless communication device 101b over an intra-cluster communication channel that can be based on the wireless cellular communication network, such as D2D communication, WiMAX and the like, or a different channel, such as WiFi.

As the mobile wireless communication device 101a has changed its state from network-idle mode to network-connected mode, the cluster head, i.e. the mobile wireless communication device 101b (which in the exemplary embodiment shown in FIG. 2 is in the network-idle mode), selects the mobile wireless communication device 101a to be the cluster rapporteur. In other words, the cluster head 101b assigns the role of cluster rapporteur to the mobile wireless communication device 101a (step 215 of FIG. 2). Thus, the mobile wireless communication device 101a, which is not the cluster head and is in the network-connected mode, is configured to be selected by the cluster head 101b as the cluster rapporteur for communicating with the location management server 105.

In step 217 of FIG. 2 the cluster head, i.e. the mobile wireless communication device 101b is informed that by way of example the mobile wireless communication device 101c, i.e. "Cluster Member-j", leaves the cluster. The cluster head, i.e. the mobile wireless communication device 101b, is configured to forward this information to the cluster rapporteur (step 219 of FIG. 2), which in this case is the mobile wireless communication device 101a, which is in network-connected mode relative to the wireless communication network. In an embodiment, the mobile wireless communication device 101b is configured to forward this information as part of an "Update Cluster Member List" message. In an embodiment, this message can contain, but is not limited to: a cluster identifier, identifiers of the cluster members, such as the IMSIs of the cluster members, aggregated information from cluster members, such as base station Physical Cell Identifiers (PCIs) the cluster members are attached to or camped in, location information about the cluster members, such as GPS information, mobility information, e.g., mean velocity, and maximum cluster coverage area. In step 221 of FIG. 2 the mobile wireless communication device 101a in its role as cluster rapporteur forwards the "Update Cluster Member List" message via the base station 103a to the location management server 105. Thus, the mobile wireless communication device 101a in its role as cluster rapporteur is configured to send cluster location management information to the location management server 105, wherein the cluster location management information comprises information about the location of the cluster head and/or information about the respective locations of the mobile wireless communication devices 101a-c of the cluster of mobile wireless communication devices. In response thereto the location management server 105 updates in step 223 of FIG. 2 the list of cluster members stored on the location management server 105. Moreover, the location management server 105 can recalculate the paging area, since it knows the position of the group of mobile wireless communication devices 101a-c with a high accuracy since it knows the position of the cluster head with a single cell's accuracy. A new tracking area list (TAL) may be communicated to the cluster head if it is needed (e.g., if the cluster head wants to communicate this information to the other cluster members so they can avoid performing a location update when they leave the cluster). This communication is decided by the location server (e.g., MME in LTE). In the example of FIG. 2, no such communication takes place.

As the person skilled in the art will appreciate, the mobile wireless communication devices 101a-c described above are fully equivalent in the sense that each of the mobile wireless communication devices 101a-c could in a network-idle mode or a network-connected mode and could be the assigned the role of cluster head and/or the role of cluster rapporteur.

In an embodiment, the mobile wireless communication device being the cluster rapporteur will communicate any location information whenever it is needed (e.g., send location update whenever the cluster members are crossing the boundaries of a TA or a TAL or even a single cell, or when a timer expires) to the location management server 105.

In an embodiment, the mobile wireless communication device being the cluster rapporteur is configured to determine the frequency or the content of the cluster location management information or the events that trigger the sending of the cluster location management information to the location management server 105.

In an embodiment, the cluster rapporteur is configured to send cluster location management information to the location management server 105 whenever the cluster formation changes. This comprises the cases that new members have been added to the cluster, or existing cluster members decide to leave, or when two clusters are merged to a new one etc. Moreover, in an embodiment, a cluster is considered to be modified when a new cluster head is elected, so that also in this case the cluster rapporteur will send an update to the location management server 105. In an embodiment, the cluster rapporteur is configured to send cluster location management information periodically to the location management server 105.

In an embodiment, the location management server 105 (e.g., the Mobility Management Entity (MME) in LTE networks) receives the cluster location management information from the cluster rapporteur and proactively produces a new TAL (Tracking Area List) based on this information and the cluster identifier. More specifically, in an embodiment, the location management server 105 calculates a TAL for the cluster ("cluster specific TAL"). The location management server 105 is able to predict the imminent probable TAs of the cluster, in order to provide a highly optimized TAL. This TAL is constructed based on, e.g., the indication that the cluster head has moved to a new cell, the collected information from the cluster (reported when the cluster operated in connected mode), and/or a direction vector calculated from the location and velocity information (reported when the cluster operated in connected mode). Moreover, in an embodiment, the location management server 105 (MME in the case of a LTE network) may perform S-GW change or a change to a more suitable location management server proactively (for the whole cluster) simplifying thus the typical TAU process (e.g., reduction of the messages for TAU, elimination of authentication process and S-GW change). On the basis thereof, since the location management server 105 is aware of the location and the cluster location management information, it may accurately determine the Paging Area.

In an embodiment, based on the collected cluster location management information, the location management server 105 or the cluster head may decide about when to send the current location of the cluster (e.g., on a per cell basis, after crossing N cells etc). This dynamicity assists in optimizing the paging mechanism (i.e., optimize the number of cells to be paged under a high probability that the paged mobile wireless communication device will be found in the paged area).

In an embodiment, a mobile wireless communication device being not the cluster rapporteur, for instance the mobile wireless communication device 101c, is configured to refrain from sending device location management information to the location management server 105, wherein the device location management information comprises information about the location of the wireless communication device 101c. In an embodiment, wherein the wireless communication network is a LTE network, the exemplary mobile wireless communication device 101c being not the cluster rapporteur is configured to refrain from sending device location management information to the location management server 105 (in the case of an LTE network also referred to as Mobility Management Entity) by suppressing sending of tracking area update requests to the location management server 105 or by suppressing location update timers. This is further illustrated in FIG. 3.

Figure 3:
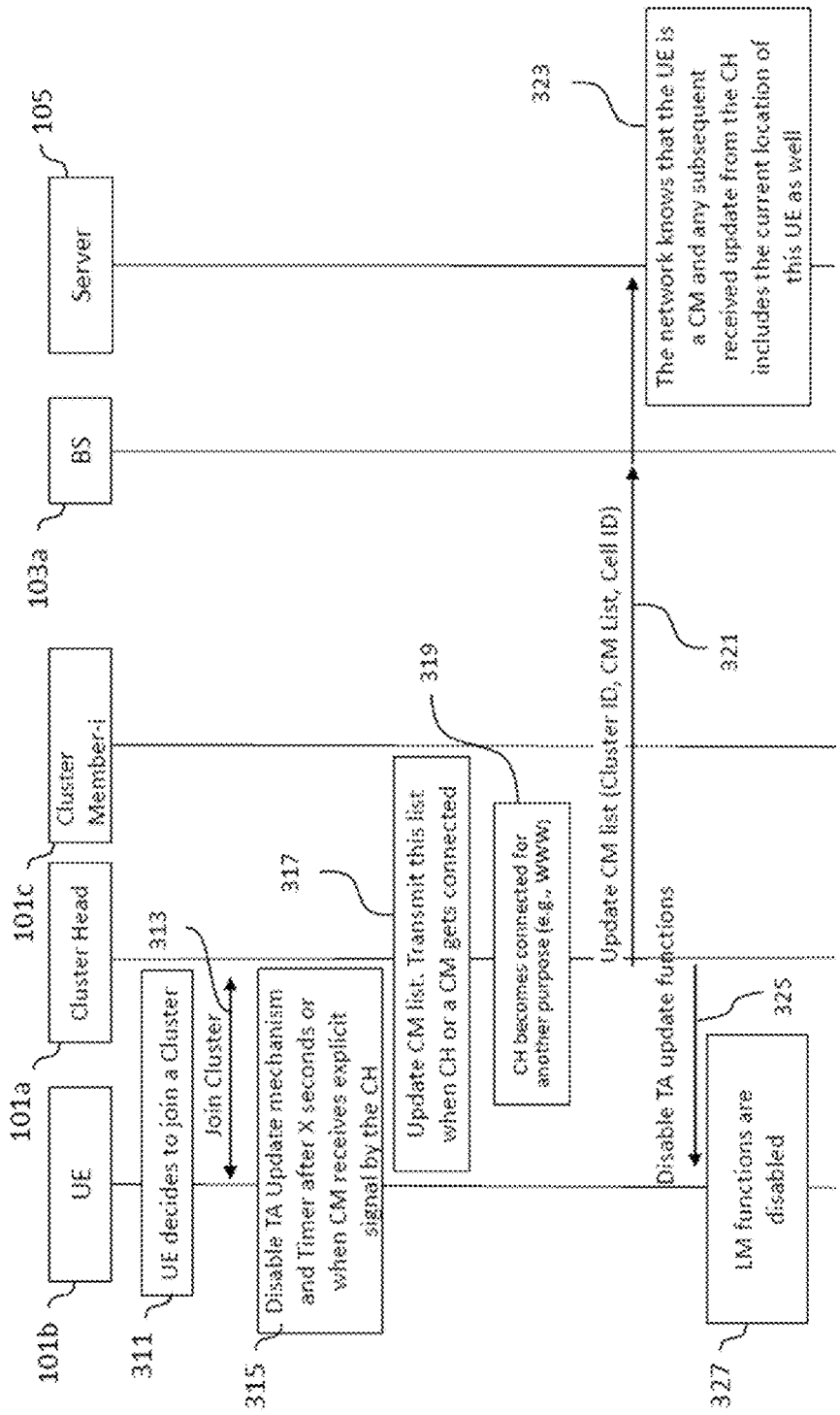
FIG. 3 shows a schematic diagram of a mobile wireless communication device and a method for communicating with a location management server over a wireless communication network according to an embodiment.

In step 311 of FIG. 3 the mobile wireless communication device 101b (referred to as UE in FIG. 3) decides to join an existing cluster of mobile wireless communication devices. Following a clustering protocol the mobile wireless communication device 101b joins in step 313 of FIG. 3 the cluster already containing the mobile wireless communication device 101a (referred to as "Cluster Head" in FIG. 3) as cluster head and the mobile wireless communication device 101c (referred to as "Cluster Member-i" in FIG. 3). In step 315 of FIG. 3 the mobile wireless communication device 101b being not the cluster rapporteur disables its TA update mechanism and timer, either after a certain time period or an explicit order received from the cluster head, i.e. the mobile wireless communication device 101a. In step 317 of FIG. 3 the cluster head, i.e. the mobile wireless communication device 101a, updates its list of cluster members. In step 319 of FIG. 3 the cluster head gets connected to the wireless communication network, i.e. changes its state from network-idle mode to network-connected mode. The cluster head, i.e. the mobile wireless communication device 101a, now assumes the role of cluster rapporteur as well and sends in step 321 of FIG. 3 cluster location management information in the form of an "Update Cluster Member List" request via the base station 103a to the location management server 105. In response thereto the location management server 105 updates in step 323 of FIG. 3 the list of cluster members stored on the location management server 105. In an embodiment, in step 325 of FIG. 3 the cluster head sends a message to the mobile wireless communication device 101b, which recently joined the cluster of the cluster head, to disable its TA update functions. In response thereto, the mobile wireless communication device 101b disables its location management update functions, i.e. it suppresses sending of tracking area update requests to the location management server 105 and location update timers.

As the person skilled in the art will appreciate from the embodiment shown in FIG. 3, according to embodiments of the present disclosure mobile wireless communication device, for instance the mobile wireless communication device 101a, can have both the cluster head role and the cluster rapporteur role and that the cluster head can select itself to be the cluster rapporteur as well. In an embodiment, the mobile wireless communication device 101a in its role as cluster head is configured to select itself to be the cluster rapporteur for communicating with the location management server 105, in case the mobile wireless communication device 101a is in the network-connected or the network-idle mode and the other mobile wireless communication devices of the cluster of mobile wireless communication devices, such as the mobile wireless communication device 101b and 101c, are in the network-idle mode.

Moreover, the embodiment shown in FIG. 3 and described above allows to delay sending a modified list of cluster members to the location management server 105 until a cluster member gets connected, i.e. changes to the network-connected mode. This embodiment is beneficial in less stable situations with frequent cluster changes, as frequent signaling exchanges are avoided. In an embodiment, in order to avoid losing track of any mobile wireless communication device, when the device becomes a cluster member, the mobile wireless communication device may keep the standard location management functions active until the location management server 105 has received the information that the mobile wireless communication device has become a cluster member. During this time the mobile wireless communication device is still reachable through paging, since the location management server 105 is aware of the TAL of the mobile wireless communication device.

Figure 4:
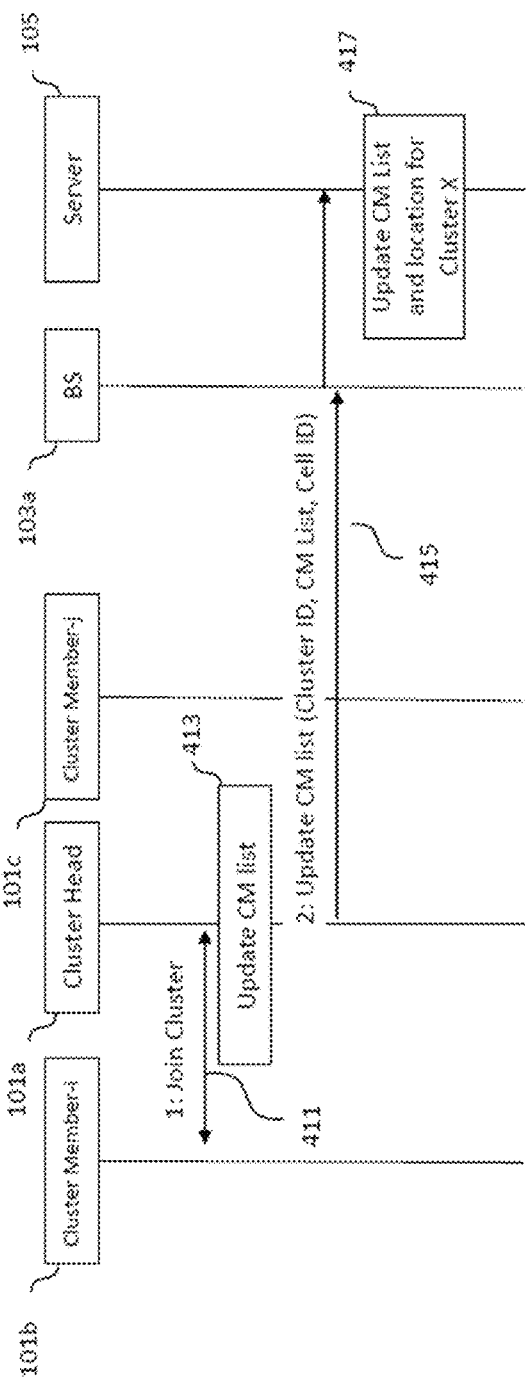
FIG. 4 shows a schematic diagram of a mobile wireless communication device and a method for communicating with a location management server over a wireless communication network according to an embodiment.

FIG. 4 shows an embodiment similar to the embodiment shown in FIG. 3. In step 411 of FIG. 4 the mobile wireless communication device 101b joins a cluster already containing the mobile wireless communication device 101a as the cluster head and the mobile wireless communication device 101c. In step 413 of FIG. 4 the mobile wireless communication device 101b in its role as cluster head updates its list of cluster members. The mobile wireless communication device 101a being also the cluster rapporteur sends in step 415 of FIG. 4 cluster location management information in the form of an "Update Cluster Member List" request via the base station 103a to the location management server 105, which has already been described further above. In response thereto the location management server 105 updates in step 417 of FIG. 4 the list of cluster members stored on the location management server 105.

Figure 5:
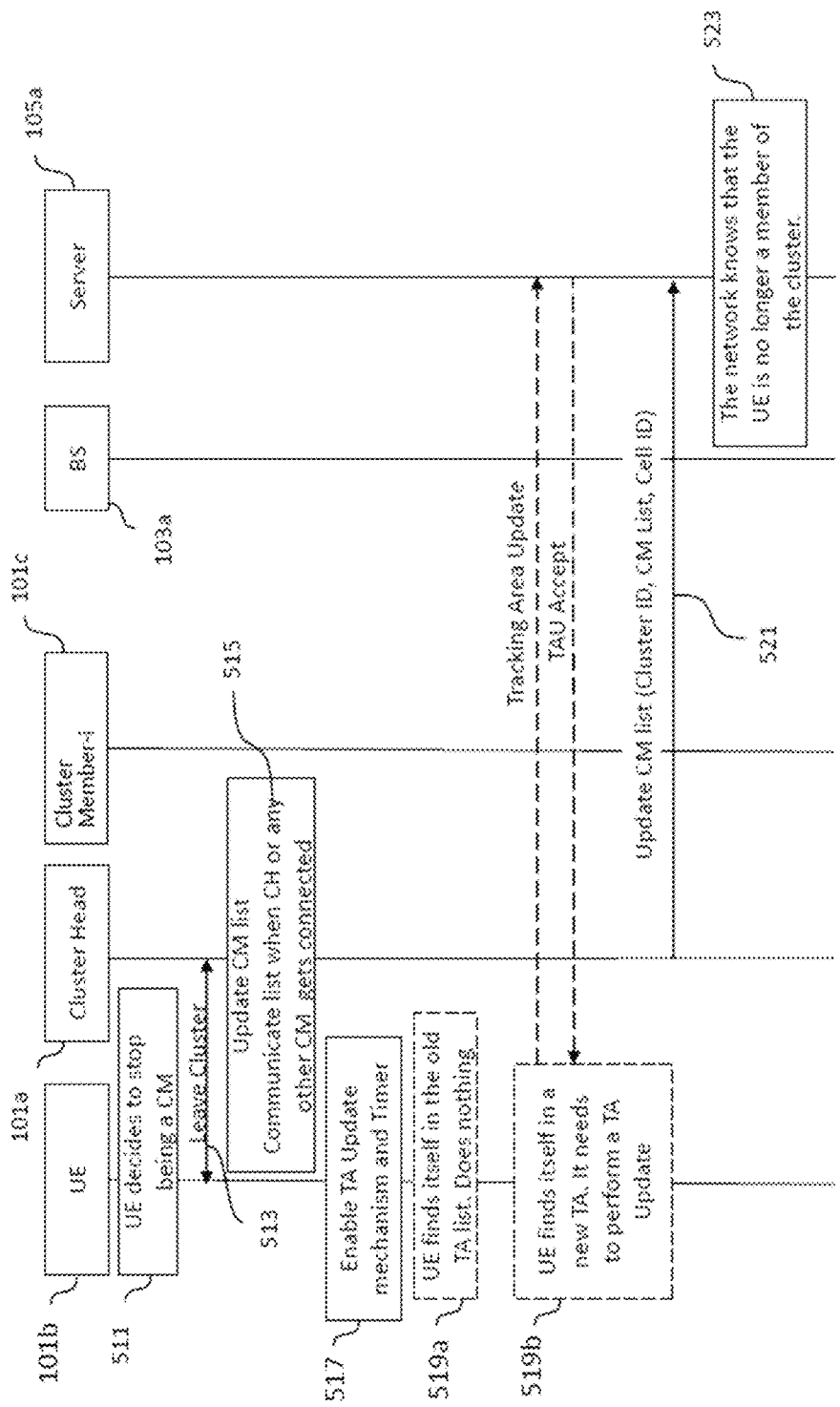
FIG. 5 shows a schematic diagram of a mobile wireless communication device and a method for communicating with a location management server over a wireless communication network according to an embodiment.

FIG. 5 shows an embodiment, in which a cluster member leaves a cluster. In step 511 of FIG. 5 the mobile wireless communication device 101b decides to leave the cluster comprising by way of example the mobile wireless communication devices 101a-c. In step 513 of FIG. 5 the mobile wireless communication device 101b sends a corresponding notification to the cluster head, which in this exemplary embodiment is the mobile wireless communication device 101a. In response thereto, the cluster head, i.e. the mobile wireless communication device 101a, updates its internal list of cluster members (step 515 of FIG. 5). The mobile wireless communication device 101b, in turn, enables in step 517 its TA (Tracking Area) update mechanism and timer. In case the mobile wireless communication device 101b finds itself in the old TA no further actions are required by the mobile wireless communication device 101b (alternative 519a of FIG. 5). However, in case the mobile wireless communication device 101b finds itself in a new TA, it performs a Tracking Area Update (TAU) with the location management server 105. The cluster head, i.e. the mobile wireless communication device 101a, in turn, in its additional role as cluster rapporteur sends in step 521 of FIG. 5 cluster location management information in the form of an "Update Cluster Member List" request via the base station 103a to the location management server 105, thereby informing the location management server 105 that the mobile wireless communication device 101b is no longer a member of the cluster (step 523 of FIG. 5).

A further embodiment of the disclosure applies to the case, when there is no connection established from any cluster member including the cluster head (e.g., all members in the cluster are in the LTE RRC IDLE state of LTE). In this further embodiment the cluster head is operating as the cluster rapporteur without being in the network-connected mode and is configured to use a non-contentious RACH (Radio Access Channel) procedure for sending cluster location management information to the location management server 105. This further embodiment based on a non-contentious RACH (Radio Access Channel) procedure can be used on a per cell basis or on any other granularity defined by the location management server 105 or the cluster head.

Basically, in the non-contentious RACH procedure embodiment dedicated preambles are allocated solely to cluster heads in advance to be used to inform the location management server 105 about their current cell. In an embodiment, this may take place when the cluster head is selected and this information is communicated to the location management server 105. Whether RACH preambles are allocated or not, is decided by the location management server 105 and is valid for a specific area and for a specific time. By pre-allocating preambles the signaling cost can be reduced (e.g., when compared to the standard LTE procedure defined in TS23.401: Connection request, Contention Resolution, RRCconnectionRequest, RRCconnectionResponse, TAU processes can be skipped). This is because the wireless communication network knows to which cluster head it has assigned a specific preamble and also knows that if this preamble is used then it signifies cluster location management information and not a request to establish a signaling connection with the network. A similar non-contentious RACH procedure is used in some current mobile networks (e.g., LTE Release 8) during the Handover procedure. For example, during handover the target base station allocates a preamble for the incoming mobile wireless communication device and this information is passed (through the source base station) to the mobile wireless communication device.

Figure 6:
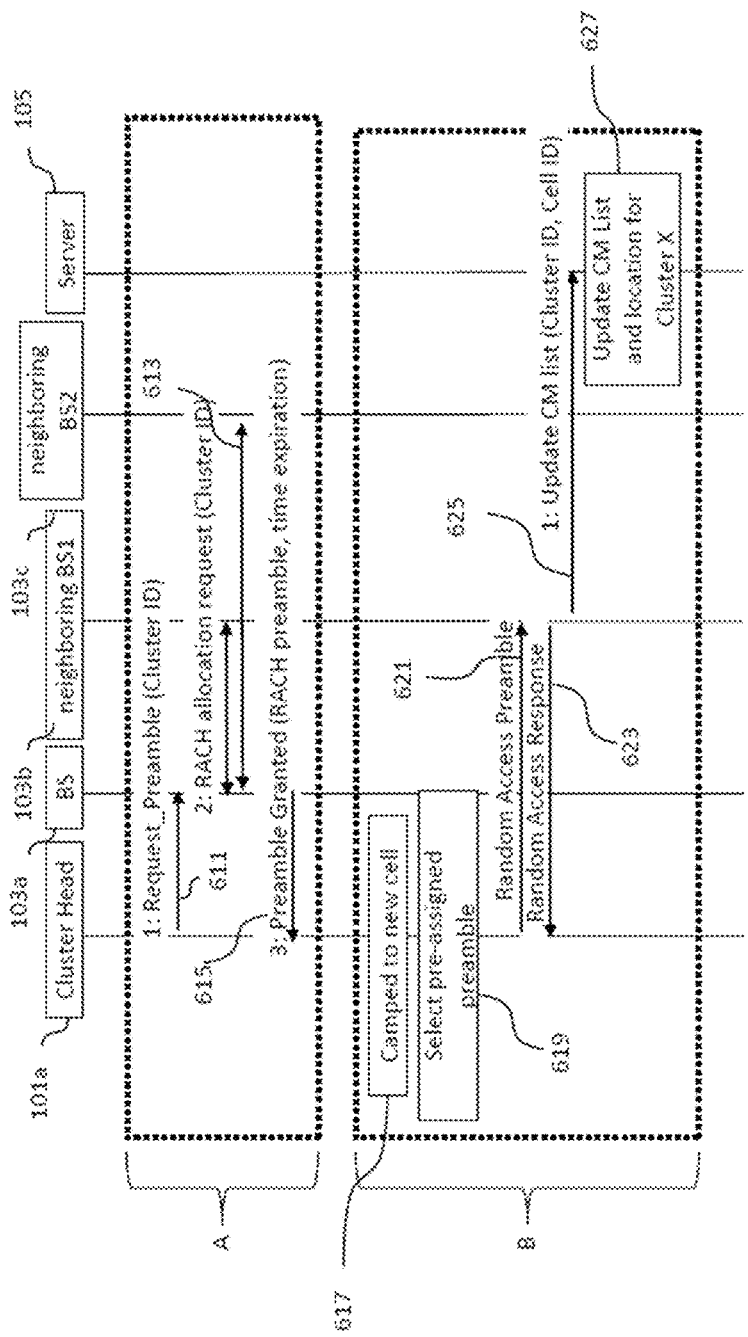
FIG. 6 shows a schematic diagram of a mobile wireless communication device and a method for communicating with a location management server over a wireless communication network according to an embodiment.

The non-contentious RACH procedure embodiment of the present disclosure will be described in further detail under reference to FIG. 6. The cluster head, i.e. the mobile wireless communication device 101a, is initially connected to the source base station 103a and requests at least one dedicated preamble (step 611 of FIG. 6). The source base station 103a, e.g., on the basis of the position and velocity of the cluster head, sends a RACH allocation request to get a RACH preamble from the wireless communication network. In an embodiment, the source base station 103a will directly communicate with the neighboring base stations 103b and 103c so as to reserve and acquire a preamble for the cluster head, i.e. the mobile wireless communication device 101a (step 613 of FIG. 6). In an alternative embodiment, the location management server 105 (or a different entity in the network) undertakes the responsibility to estimate a possible subset of its neighboring (target) base stations 103b and 103c that the cluster head may connect to in the future. The location management server forwards the RACH preamble allocation request to each of these target base stations 103b and 103c. In an embodiment, the RACH allocation request includes the necessary context information, for instance, the cluster head ID, estimated time of validity for the RACH preamble etc. Each of the target base stations 103b and 103c may allocate a RACH preamble over a specified time period and send a RACH allocation preamble response to the location management server 105 and from there subsequently to the source base station 103a. In an embodiment, the RACH allocation response can include the following data elements: a RACH preamble configuration index and/or time expiration/scheduling information.

In an embodiment, the target base station 103b, 103c can follow a semi-persistent scheduling approach (instead of dedicated) for the RACH preamble allocated to the cluster head 101a and may choose to schedule multiple cluster heads in the same preamble. In an embodiment, the source base station 103a sends an enhanced RRC Connection Release message to the cluster head 101a which contains this information (step 615 of FIG. 6) and afterwards the cluster head 101a becomes idle. In an embodiment, the enhanced RRC Connection Release message includes at least a list of the preambles allocated to each base station 103a-c. In an embodiment, this list can comprise the following data elements: Base Station Physical Cell Identity, RACH preamble configuration index, Time expiration/Scheduling information.

After the cluster head 101a has performed a cell reselection procedure, it checks its maintained list with RACH allocation information and if the selected target base station, for instance the target base station 103b, has allocated a RACH preamble for it and if the time period has not expired. Then the cluster head 101a (being in the network-idle mode) follows a contention-free (or non-contentious) RACH procedure illustrated in section B of FIG. 6, which "indirectly" provides the location management server 105 with information about the location of the cluster head. In other words, the cluster head, i.e. the wireless mobile communication device 101a is configured to use a non-contentious RACH procedure for sending cluster location management information to the location management server 105. When such a RACH preamble is pre-allocated the wireless mobile communication device 101a being the cluster head and the cluster rapporteur may use it as shown in steps 617 to 627 of FIG. 6. When the wireless communication device 101a camps to a new cell and decides that it has to report the new location for its cluster to the network it will select the pre-assigned preamble (step 619). The preamble will be transmitted and a response will be sent back by the network, for instance the first neighboring base station 103b (steps 621 and 623), but at the same time the first neighboring base station 103b that received the specific RACH preamble will generate a location related message and send it to the location management server 105 (step 625) allowing the location management server 105 to update its cluster location information (step 627).

A further embodiment of the disclosure applies to the case, when there is no connection established from any cluster member including the cluster head (e.g., all members in the cluster are in the LTE RRC IDLE state of LTE). In this further embodiment, which will be described in more detail in the context of FIG. 7 further below, the cluster head is operating as the cluster rapporteur without being in the network-connected mode and is configured to use an enhanced or modified RRC message to provide the location management server 105 with information about the location of the cluster head and, thereby, indirectly the location of the cluster members. In this embodiment, the Radio Resource and Control (RRC) functionality that controls the signaling establishment in cellular wireless communication networks is enhanced.

Figure 7:
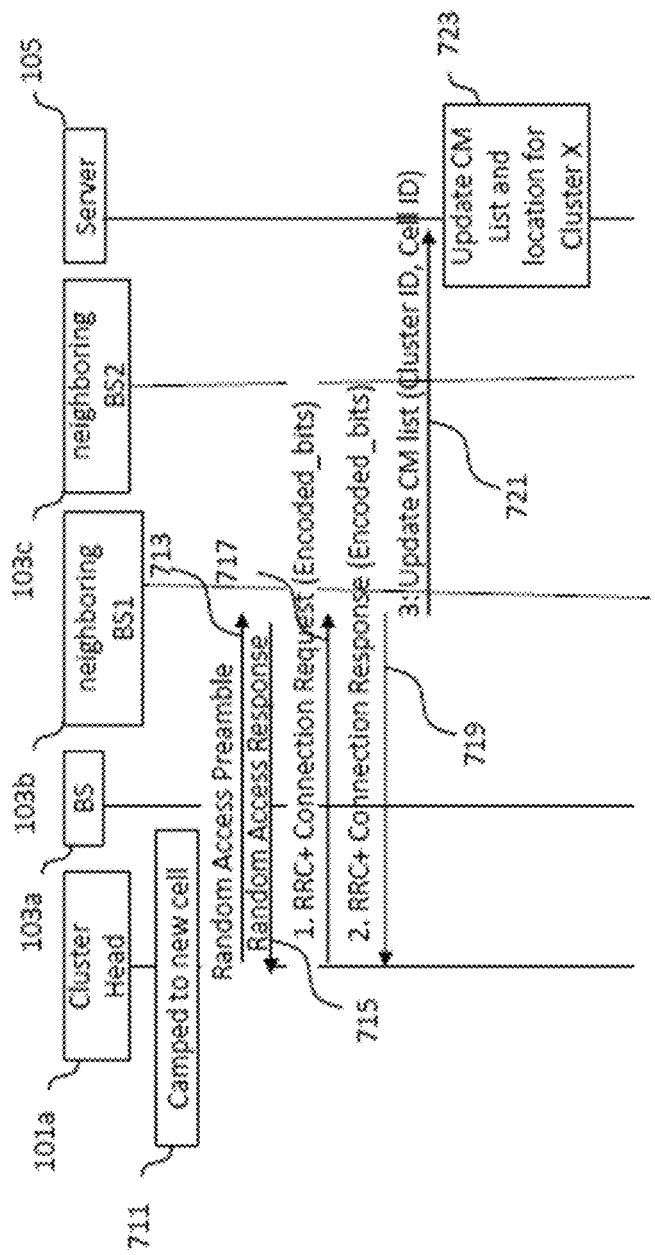
FIG. 7 shows a schematic diagram of a mobile wireless communication device and a method for communicating with a location management server over a wireless communication network according to an embodiment.

In step 711 of FIG. 7 the cluster head 101a is camped to a new cell. In step 713 of FIG. 7 the cluster head 101 sends a Random Access Preamble to the corresponding base station 103b, which replies in step 715 of FIG. 7 with a Random Access Response. These steps are the same as in the typical contention based RACH procedure (i.e. Random Access Preamble, Random Access Response) followed in cellular mobile wireless networks.

After crossing a cell, the cluster head, i.e. the mobile wireless communication device 101a, is configured to send an enhanced RRC Connection Establishment Request (step 717 of FIG. 7). In an embodiment, the request can be a request including a marker (e.g., appropriate encoding of bits, specific use of additional information elements) indicating to the wireless communication network that instead of establishing a signaling connection, the base station 103b should reject this request and notify instead the location management server 105 about the current location of the cluster head to allow the location management server 105 to update the location of the cluster associated with the cluster head (steps 719, 721 and 723 of FIG. 7).

In an embodiment, the base station 103b also sends a RACH allocation request to a subset of its neighboring base stations, to which the cluster head may connect in the future. In an embodiment, the corresponding message includes the ID of the cluster head. The neighboring base stations send a RACH allocation response to the base station 103b and the base stations 103b sends an RRC Connection Response to the cluster head in case of enhanced contention-based RACH procedure including a list of preambles for the neighboring base stations.

Embodiments of the present disclosure provide, amongst others, for a beneficial reduction of Tracking Area Update signaling under various circumstances (e.g., dense and stable clusters) and of Paging signaling. For example, as already described in more detail above, the location update process (e.g., referred to as Tracking Area Update—TAU in LTE) can be completely or partially deactivated from the network regarding the following triggers:

Periodic Timer (e.g., T3412 in LTE): This can be suspended for all the cluster members and the cluster head as long as they remain in the cluster;

New TAL identified: TAU is suspended for the cluster members and the cluster head. The cellular wireless communication network is capable of determining the position of cluster members based on the location context information received from the cluster rapporteur, the cluster configuration information (e.g., cluster range) and the network related information (e.g., the BS to which the cluster head or any cluster member was connected to).

By increasing the cluster size, as the number of mobile wireless communication devices that deactivate periodic Location Update increases, significant signaling reduction is achieved.

Embodiments of the disclosure can be extended to other concepts that require group handling (e.g., resource management). In particular, embodiments of the disclosure can be beneficially used in scenarios with moving users that may form groups and connect to heterogeneous networks consisting of Femto/Pico/Micro/Macro stations. Moreover, embodiments of the disclosure may be easily extended so as not to be affected at all from the stability of the cluster and thus, may be applied in any scenario (i.e., pedestrians, cars, trains, MTC etc).

Embodiments of the disclosure may be implemented in a computer program for running on a computer system, at least including code portions for performing steps of a method according to the disclosure when run on a programmable apparatus, such as a computer system or enabling a programmable apparatus to perform functions of a device or system according to the disclosure.

What is claimed is:

1. A mobile wireless communication device configured to communicate with a location management server over a wireless communication network, the mobile wireless communication device being configured to be part of a cluster of mobile wireless communication devices managed on the basis of a clustering protocol, the clustering protocol configured to select one of the mobile wireless communication devices of the cluster of mobile wireless communication devices as a cluster head for representing the cluster of mobile wireless communication devices, the mobile wireless communication devices of the cluster of mobile wireless communication devices being either in a network-connected mode or a network-idle mode relative to the wireless communication network, wherein, in case the mobile wireless communication device is the cluster head, the mobile wireless communication device is configured to select one of the mobile wireless communication devices of the cluster of mobile wireless communication devices, including the mobile wireless communication device itself, being in the network-connected mode as a cluster rapporteur for communicating with the location management server; and wherein, in case the mobile wireless communication device is not the cluster head and is in the network-connected mode, the mobile wireless communication device is configured to be selected by the cluster head as the cluster rapporteur for communicating with the location management server;

wherein, in case the mobile wireless communication device is the cluster rapporteur, the mobile wireless communication device is configured to send cluster location management information to the location management server, wherein the cluster location management information comprises information about a location of the cluster head and/or information about respective locations of the mobile wireless communication devices of the cluster of mobile wireless communication devices, and wherein, in case the mobile wireless communication device is not the cluster rapporteur, the mobile wireless communication device is configured to refrain from sending device location management information to the location management server, wherein the device location management information comprises information about the location of the wireless communication device; and wherein, in case the mobile wireless communication device is the cluster head, the mobile wireless communication device is configured to select itself as the cluster rapporteur for communicating with the location management server, when the mobile wireless communication device is in the network-connected mode or the network-idle mode and the other mobile wireless communication devices of the cluster of mobile wireless communication devices are in the network-idle mode.

2. The mobile wireless communication device of claim 1, wherein the wireless communication network comprises a Long Term Evolution (LTE) network, a LTE-A network or a future evolution thereof and wherein, in case the mobile wireless communication device is the cluster head and all mobile wireless communication devices are in the network-idle mode the mobile wireless communication device is configured to use a non-contentious Random Access Channel (RACH) procedure for sending cluster location management information to the location management server.

3. The mobile wireless communication device of claim 2, wherein, in case the mobile wireless communication device is the cluster head and all mobile wireless communication devices are in the network-idle mode, the mobile wireless communication device is configured to perform the non-contentious RACH procedure on the basis of at least one dedicated RACH preamble from at least one base station of the wireless communication network.

4. The mobile wireless communication device of claim 2, wherein the mobile wireless communication device is configured to request the at least one dedicated RACH preamble from a source base station and to receive the at least one RACH preamble from the source base station, wherein the source base station has receiving the at least one dedicated RACH preamble from at least one neighboring base station.

5. The mobile wireless communication device of claim 1, wherein the wireless communication network comprises a Long Term Evolution (LTE) network, a LTE-A network or a future evolution thereof and wherein, in case the mobile wireless communication device is the cluster rapporteur, the mobile wireless communication device is configured to use an enhanced Radio Resource and Control (RRC) connection request to send cluster location management information to the location management server, wherein the enhanced RRC connection request includes a marker for indicating that the request is to be rejected and that the location of the mobile wireless communication device is to be forwarded to the location management server.

6. The mobile wireless communication device of claim 1, wherein, in case the mobile wireless communication device is the cluster rapporteur, the mobile wireless communication device is configured to determine the frequency or the content of the cluster location management information or the events that trigger the sending of cluster location management information to the location management server.

7. The mobile wireless communication device of claim 1, wherein the cluster location management information to be sent by the mobile wireless communication device to the location management server, in case the mobile wireless communication device is the cluster rapporteur, comprises an identifier of the cluster of mobile wireless communication devices, location information about the cluster head, information about the velocity of the cluster head, a list pairing an identifier of a wireless mobile communication device of the cluster of mobile wireless communication devices, such as an IMSI, with an identifier of a cell of the wireless communication network, and/or the coverage area of the cluster of mobile wireless communication devices.

8. The mobile wireless communication device of claim 1, wherein the wireless communication network comprises a Long Term Evolution (LTE) network, a LTE-A network or a future evolution thereof and wherein, in case the mobile wireless communication device is not the cluster rapporteur, the mobile wireless communication device is configured to refrain from sending device location management information to the location management server by suppressing sending of tracking area update requests to the location management server or by suppressing location update timers.

9. The mobile wireless communication device of claim 1, wherein, in case the mobile wireless communication device is the cluster rapporteur, the mobile wireless communication device is configured to send cluster location management information the location management server, each time another mobile wireless communication device joins the cluster of mobile wireless communication devices, another mobile wireless communication device leaves the cluster of mobile wireless communication devices and/or the cluster of mobile wireless communication devices is changed in a different way.

10. The mobile wireless communication device of claim 1, wherein the mobile wireless communication device is configured to communicate with the other mobile wireless communication devices of the cluster of mobile wireless communication devices over an intra-cluster communication channel.

11. A location management server configured to communicate over a wireless communication network with a cluster of wireless communication devices, wherein the location management server is configured to receive cluster location management information from the mobile wireless communication device, in case the mobile wireless communication device is the cluster rapporteur, and to adapt a location area list building procedure and/or a paging procedure implemented in the location management server on the basis of the cluster location management information; and
wherein the mobile wireless communication device is configured to be part of a cluster of mobile wireless communication devices managed on the basis of a clustering protocol, the clustering protocol is configured to select one of the mobile wireless communication devices of the cluster of mobile wireless communication devices as a cluster head for representing the cluster of mobile wireless communication devices, the mobile wireless communication devices of the cluster of mobile wireless communication devices is either in a network-connected mode or a network-idle mode relative to the wireless communication network, wherein, in case the mobile wireless communication device is the cluster head, the mobile wireless communication device is configured to select one of the mobile wireless communication devices of the cluster of mobile wireless communication devices, including the mobile wireless communication device itself, being in the network-connected mode as a cluster rapporteur for communicating with the location management server; and wherein, in case the mobile wireless communication device is not the cluster head and is in the network-connected mode, the mobile wireless communication device is configured to be selected by the cluster head as the cluster rapporteur for communicating with the location management server;

wherein, in case the mobile wireless communication device is the cluster rapporteur, the mobile wireless communication device is configured to send cluster location management information to the location management server, wherein the cluster location management information comprises information about a location of the cluster head and/or information about respective locations of the mobile wireless communication devices of the cluster of mobile wireless communication devices, and wherein, in case the mobile wireless communication device is not the cluster rapporteur, the mobile wireless communication device is configured to refrain from sending device location management information to the location management server, wherein the device location management information comprises information about the location of the wireless communication device; and wherein, in case the mobile wireless communication device is the cluster head, the mobile wireless communication device is configured to select itself as the cluster rapporteur for communicating with the location management server, when the mobile wireless communication device is in the network-connected mode or the network-idle mode and the other mobile wireless communication devices of the cluster of mobile wireless communication devices are in the network-idle mode.

12. The location management server of claim 11, wherein the wireless communication network comprises a Long Term Evolution (LTE) network, a LTE-A network or a future evolution thereof and wherein, in case the mobile wireless communication device is the cluster head and all mobile wireless communication devices are in the network-idle mode the mobile wireless communication device is configured to use a non-contentious Random Access Channel (RACH) procedure for sending cluster location management information to the location management server.

13. The location management server of claim 12, wherein, in case the mobile wireless communication device is the cluster head and all mobile wireless communication devices are in the network-idle mode, the mobile wireless communication device is configured to perform the non-contentious RACH procedure on the basis of at least one dedicated RACH preamble from at least one base station of the wireless communication network.

14. The location management server of claim 12, wherein the mobile wireless communication device is configured to request the at least one dedicated RACH preamble from a source base station and to receive the at least one RACH preamble from the source base station, wherein the source base station has receiving the at least one dedicated RACH preamble from at least one neighboring base station.

15. The location management server of claim 11, wherein the wireless communication network comprises a Long Term Evolution (LTE) network, a LTE-A network or a future evolution thereof and wherein, in case the mobile wireless communication device is the cluster rapporteur, the mobile wireless communication device is configured to use an enhanced RRC connection request to send cluster location management information to the location management server, wherein the enhanced Radio Resource and Control (RRC) connection request includes a marker for indicating that the request is to be rejected and that the location of the mobile wireless communication device is to be forwarded to the location management server.

* * * * *

UNITED STATES PATENT AND TRADEMARK OFFICE
CERTIFICATE OF CORRECTION

PATENT NO. : 10,200,966 B2
APPLICATION NO. : 15/816625
DATED : February 5, 2019
INVENTOR(S) : Kaloxylos et al.

Page 1 of 1

It is certified that error appears in the above-identified patent and that said Letters Patent is hereby corrected as shown below:

On the Title Page

Page 2, Column 2, Line 12 Other Publications "3GPP TS 23A01" should read -- 3GPP TS 23.401 --.

Signed and Sealed this
Twenty-fourth Day of December, 2019

Andrei Iancu
*Director of the United States Patent and Trademark Office*